United States Patent
Salter et al.

(10) Patent No.: US 12,252,379 B2
(45) Date of Patent: Mar. 18, 2025

(54) WINCH CONTROL USING REASSIGNED VEHICLE INPUT DEVICE

(71) Applicant: Ford Global Technologies, LLC, Dearborn, MI (US)

(72) Inventors: Stuart C. Salter, White Lake, MI (US); William Wurz, San Francisco, CA (US); Ryan J. O'Gorman, Beverly Hills, MI (US); Peter Phung, Windsor (CA); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 674 days.

(21) Appl. No.: 17/369,220

(22) Filed: Jul. 7, 2021

(65) Prior Publication Data
US 2023/0010224 A1 Jan. 12, 2023

(51) Int. Cl.
*B66D 1/46* (2006.01)
*B60K 25/06* (2006.01)
*B62D 1/04* (2006.01)
*B66D 1/12* (2006.01)

(52) U.S. Cl.
CPC ............... *B66D 1/46* (2013.01); *B60K 25/06* (2013.01); *B62D 1/046* (2013.01); *B66D 1/12* (2013.01)

(58) Field of Classification Search
CPC . B66D 1/46; B66D 1/12; B60K 25/06; B62D 1/046
See application file for complete search history.

(56) References Cited

U.S. PATENT DOCUMENTS

| | | | |
|---|---|---|---|
| 6,981,695 B1 | 1/2006 | Hedlund et al. | |
| 10,773,827 B2 | 9/2020 | Mecklenburg | |
| 10,883,235 B2 | 1/2021 | Norstad et al. | |
| 2018/0107236 A1* | 4/2018 | Weigand | A01B 71/02 |
| 2018/0312275 A1* | 11/2018 | Mecklenburg | B64F 1/08 |
| 2020/0064825 A1* | 2/2020 | Woodley | G05D 1/0011 |
| 2021/0139299 A1* | 5/2021 | Crain | B66D 1/00 |

FOREIGN PATENT DOCUMENTS

| | | |
|---|---|---|
| CN | 112761801 A | 5/2021 |
| FR | 2930483 B1 | 10/2009 |

OTHER PUBLICATIONS

Aicrane, Heavy Duty Electric Winch, retrieved from https://www.ellsencranes.com/heavy-duty-electric-winch/ on May 18, 2021.
Labonville, Norse 350 3 Point Hitch-30-60 HP-350W, retrieved from https://www.labonville.com/Norse-350-3-Point-Hitch-30-60-HP-_p_80.html on May 18, 2021.
Ramsey Winch, Patriot 15000-Ramsey Winch—Be Mighty, retrieved from https://ramseywinch.net/shop/applications/work-truck/patriot-profile-12000/ on May 18, 2021.

* cited by examiner

*Primary Examiner* — Vivek D Koppikar
*Assistant Examiner* — Jeffrey R Chalhoub
(74) *Attorney, Agent, or Firm* — Vichit Chea; Carlson, Gaskey & Olds, P.C.

(57) ABSTRACT

A vehicle winch control assembly includes, among other things, a winch, and a vehicle input device that is reassigned to control the winch. The vehicle input device can be an accelerator pedal. A vehicle winch control method includes, among other things, reassigning a vehicle input device, and, after the reassigning, controlling a winch using the vehicle input device.

18 Claims, 4 Drawing Sheets

WINCH CONTROL USING REASSIGNED VEHICLE INPUT DEVICE

TECHNICAL FIELD

This disclosure relates generally to a winch and, more particularly, to a winch that can be controlled through a reassigned vehicle input device.

BACKGROUND

Some vehicles can be equipped with a winch. The winch can be used to pull the vehicle out of mud, snow, sand, etc. Some vehicles power the winch through a power takeoff. Some vehicles power the winch from a vehicle battery.

SUMMARY

A vehicle winch control assembly according to an exemplary aspect of the present disclosure includes, among other things, a winch, and a vehicle input device that is reassigned to control the winch.

In another example of the forgoing assembly, the vehicle input device is an accelerator pedal.

In another example of any of the foregoing assemblies, the winch is configured to speed up in response to the accelerator pedal being pressed down.

In another example of any of the foregoing assemblies, the vehicle input device is a brake pedal.

In another example of any of the foregoing assemblies, the vehicle input device is a steering wheel mounted switch.

In another example of any of the foregoing assemblies, the steering wheel mounted switch is a cruise control switch.

Another example of any of the foregoing assemblies includes an electrified vehicle. The winch is connected to the electrified vehicle.

In another example of any of the foregoing assemblies, the winch is connected to a front end of the electrified vehicle.

Another example of any of the foregoing assemblies includes an electric motor that drives wheels of the electrified vehicle. The electric motor is configured to selectively drive the winch.

Another example of any of the foregoing assemblies includes a power takeoff. The electric motor drives the winch through the power takeoff.

A vehicle winch control method according to another exemplary aspect of the present disclosure includes, among other things, reassigning a vehicle input device, and, after the reassigning, controlling a winch using the vehicle input device.

Another example of the foregoing method includes controlling the winch using an accelerator pedal of a vehicle.

Another example of any of the foregoing methods includes speeding up the winch by pressing down on an accelerator pedal and slowing down the winch by lifting off the accelerator pedal.

Another example of any of the foregoing methods includes pressing a brake pedal of a vehicle to stop the winch.

In another example of any of the foregoing methods, the vehicle input device is a steering wheel mounted switch. The method includes controlling the winch using the steering wheel mounted switch.

In another example of any of the foregoing methods, the winch is connected to an electrified vehicle during the controlling.

Another example of any of the foregoing methods includes driving the winch using an electric machine of an electrified vehicle. The electric machine is configured to drive wheels of the electrified vehicle.

Another example of any of the foregoing methods includes driving the winch through a power takeoff from the electric machine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a winch that can be controlled through a vehicle input device, such as a pedal or switch, that is reassigned to control the winch. In some examples, the winch can be driven by an electric machine of the electrified vehicle.

Figure 1:
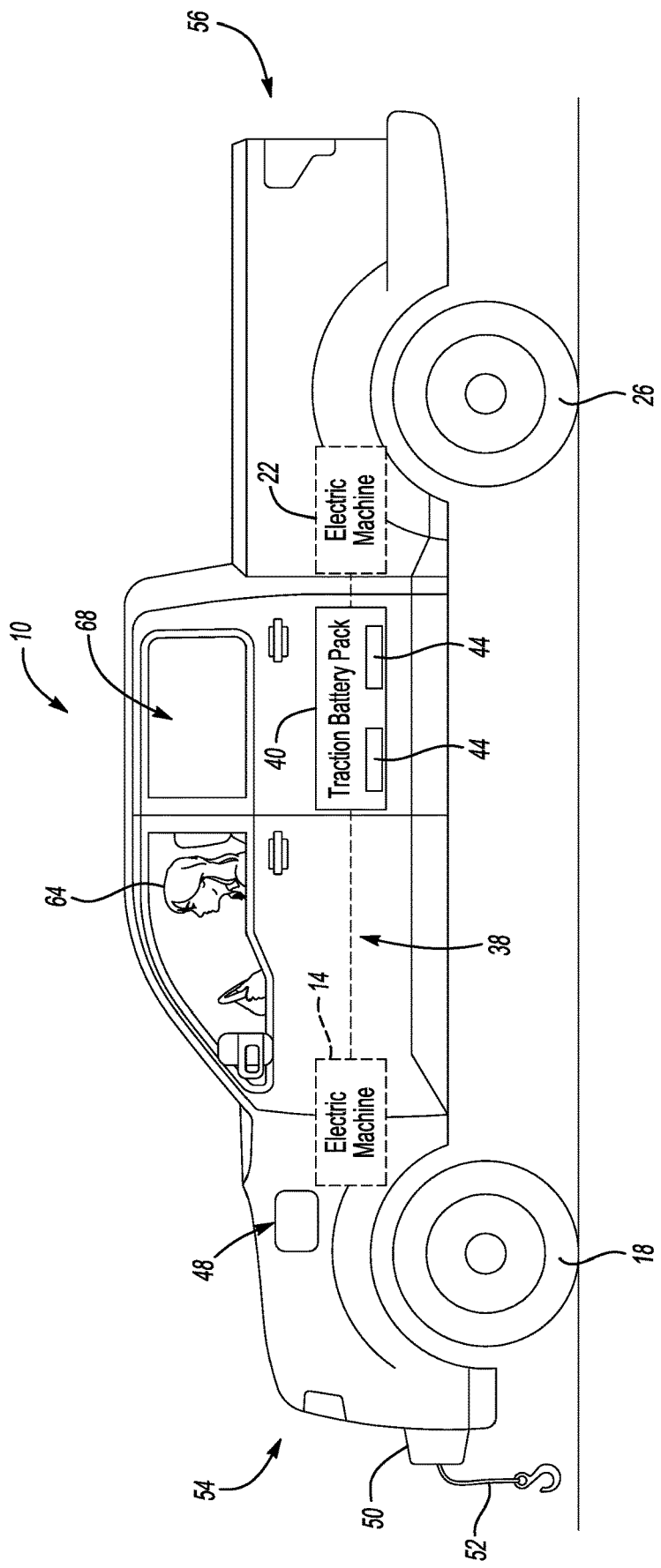
FIG. 1 illustrates a side view of winch connected to a vehicle.
Figure 2:
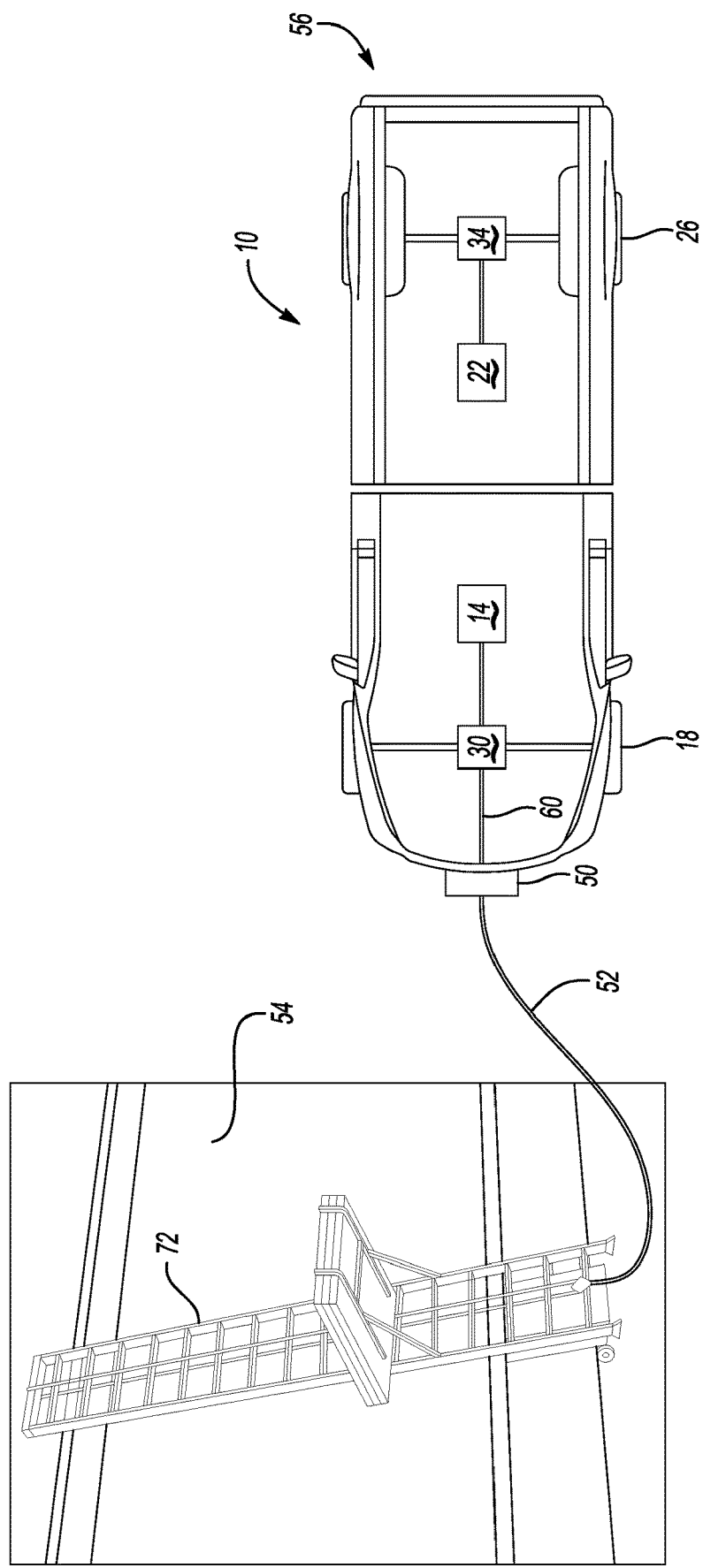
FIG. 2 illustrates a schematic view of an underside of the vehicle of FIG. 1 when the winch is used to move a load up and down a ladder.

With reference to FIGS. 1 and 2, an electrified vehicle 10 includes an electrified powertrain. In the exemplary embodiment, the electrified vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In the embodiment illustrated in FIG. 1, the vehicle 10 is a full electric vehicle. The vehicle 10 is propelled by a front electric machine 14 that is used to drive front wheels 18, and a rear electric machine 22 that is used to drive rear wheels 26. The electric machines 14 and 22 can be operated together when the vehicle 10 is in an All Wheel Drive mode. The electric machines 14 and 22 can be operated separately when the vehicle 10 is in a Front Wheel Drive mode or a Rear Wheel Drive mode. The example vehicle 10 can be propelled through the electric machines 14 and 22 without any assistance from an internal combustion engine.

The electric machines 14 and 22 can operate as electric motors, as electric generators, or both. The electric machine 14, when powered, provides a rotational output torque to the front wheels 18 through a front differential 30. The electric machine 22, when powered, provides a rotational output torque to the rear wheels 26 through a rear differential 34.

A voltage bus 38 electrically connects the electric machines 14 and 22 to a battery pack 40. The traction battery pack 40 can be a high-voltage traction battery pack that includes one or more battery arrays 44 (i.e., battery assemblies or groupings of rechargeable battery cells capable of outputting electrical power to operate the electric machine and/or electrical loads of the electrified vehicle 10). The traction battery pack 40 can be recharged by connecting a charge cord to a charge port 48 of the electrified vehicle 10.

A winch 50 is connected to the vehicle 10. The winch 50 includes a cable 52 that the winch 50 pulls or lets out. The cable 52 could be a wire or rope in other examples.

The example winch 50 is connected to a front end 54 of the vehicle 10. In another example, the winch 50 could be connected to another area of the vehicle 10, such as an aft end 56 of the vehicle 10.

The winch 50 is a powered winch. The winch 50, in the exemplary embodiment, is powered by the front electric machine 14 through a power takeoff (PTO) 60 from the front differential 30. The front differential 30 can disconnect from the front wheels 18 when the winch 50 is powered by the front electric machine 14.

In another example, the winch 50 could be powered by the rear electric machine 22 through a power takeoff from the rear differential 34. The winch 50 could be secured to the aft end 56 of the vehicle when powered by the rear electric machine 22.

The example winch 50 can be controlled by a user 64 from within a passenger compartment 68 of the vehicle 10. Controlling the winch 50 can include starting a pull in or pull out of the cable 52, setting a pull in or pull out speed, etc. The pull in and pull out speeds of the example winch 50 can range from 40 feet/minute to 5 feet/minute.

In some examples, the user 64 can control the winch 50 by setting start and stop limits for repeated applications. For example, if the user 64 is relying on the winch 50 to move several loads of materials up and down a 30-foot tall ladder 72 as shown in FIG. 2, the user 64 can establish a start/stop limit for the cable 52 pull in and pull out lengths at 29 feet.

Controlling the winch 50 can, in some examples, include the user 64 setting different pull in and pull out speeds at different phases of cable 52 pull in and pull out. For example, the user 64 could control the winch 50 by setting the speed of the winch 50 at start of a pull to have a relatively slow speed, which facilitates a soft start and avoids spilling materials at the start of a pull. The user 64 can control the speed of the winch 50 to accelerate during the middle of a pull, and then slow down toward the end of a pull.

Controlling the winch 50 can, in some examples, including the user 64 setting pull power for the winch 50 in terms of torque/pounds of pull. Torque feedback can be provided to the user 64 through a display within the passenger compartment 68 or on a smart device. The torque may be restricted to be below a rated feet/pound of the cable 52 and the mounting type.

Figure 3:
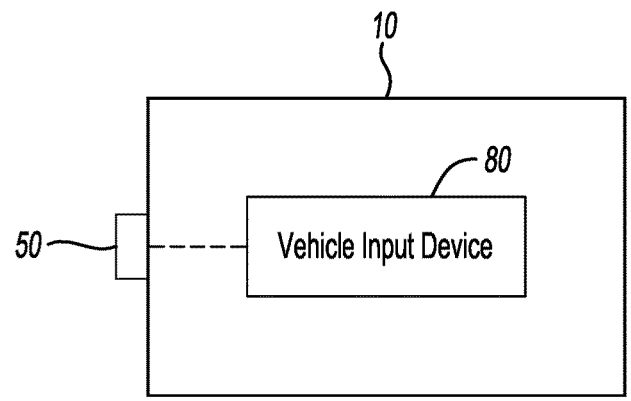
FIG. 3 illustrates a highly schematic view of the vehicle of FIG. 1 having a vehicle input device that can be reassigned to control the winch of FIG. 1.

With reference to FIG. 3 and continued reference to FIGS. 1 and 2, when the user 64 is operating the winch 50, the vehicle 10 can switch to a winch mode. When in the winch mode, vehicle input devices 80, such as pedals or switches, of the vehicle 10 are reassigned to control the winch 50. The winch 50 is thus controlled through the vehicle 10. The winch 50 can be controlled by the vehicle input devices 80 that are reassigned when the winch 50 is connected to the vehicle 10 as shown in FIGS. 1-3. In other examples, the winch 50 could be disconnected from the vehicle 10 but still controlled by vehicle input devices 80.

In an example, the reassigned vehicle input device 80 comprises a steering wheel mounted switch, such as a button on the steering wheel that is used to control cruise control operations of the vehicle 10 when the vehicle 10 is driven. After entering winch mode, the steering wheel mounted switch is reassigned and used to control, among other things, pull in and pull out speed of the cable 52.

For example, during ordinary operation, a "+" switch is mounted to the steering wheel is associated with increasing the cruise control speed. After entering winch mode, the "+" switch is reassigned and used control rotation of the winch 50. When the vehicle input device 80 (here the "+" switch) is pressed, the winch 50 is rotated such that the cable 52 is pulled out. Correspondingly, a "−" switch on the steering wheel can be reassigned when the vehicle 10 is in winch mode and, when pressed, initiate a pulling in of the cable 52.

In some examples, a display within the passenger compartment 68 or on a smart device can provide notifications to the user 64 indicating how vehicle input devices 80 have been reassigned to control the winch 50. For example, after entering winch mode, a message could be displayed indicating that pressing the cruise control "+" switch will rotate the winch 50 such that the cable 52 is pulled out.

Figures 4A, 4B, 4C:
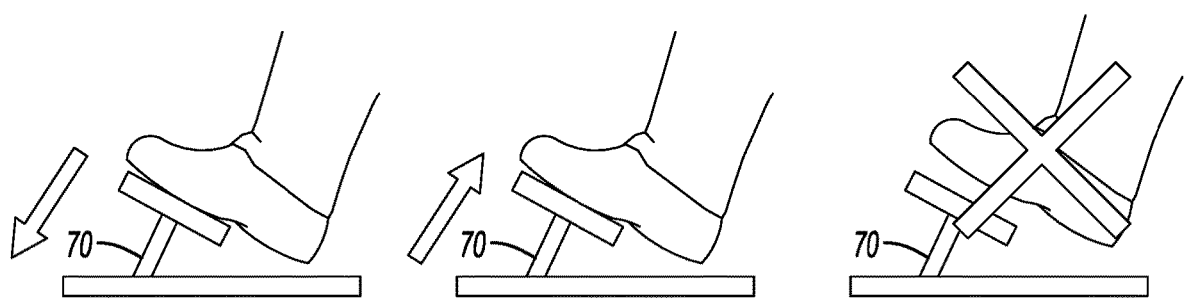
FIGS. 4A-4C illustrate a vehicle input device from the vehicle of FIG. 1.

Pedals of the vehicle 10 are another type of vehicle input device 80 that can be reassigned when the vehicle 10 is in a winch mode. With reference to FIGS. 4A-4C and continuing reference to FIGS. 1-3, an accelerator pedal 70 of the vehicle 10 can be reassigned such that pressing down on the accelerator pedal 70 (FIG. 4A) increases a speed of the winch 50, and releasing the accelerator pedal 70 (FIG. 4B) decreases the speed of the winch 50. When the accelerator pedal 70 is not pressed (FIG. 4C), or perhaps when a brake pedal is pressed, the winch 50 stops.

Figure 5:
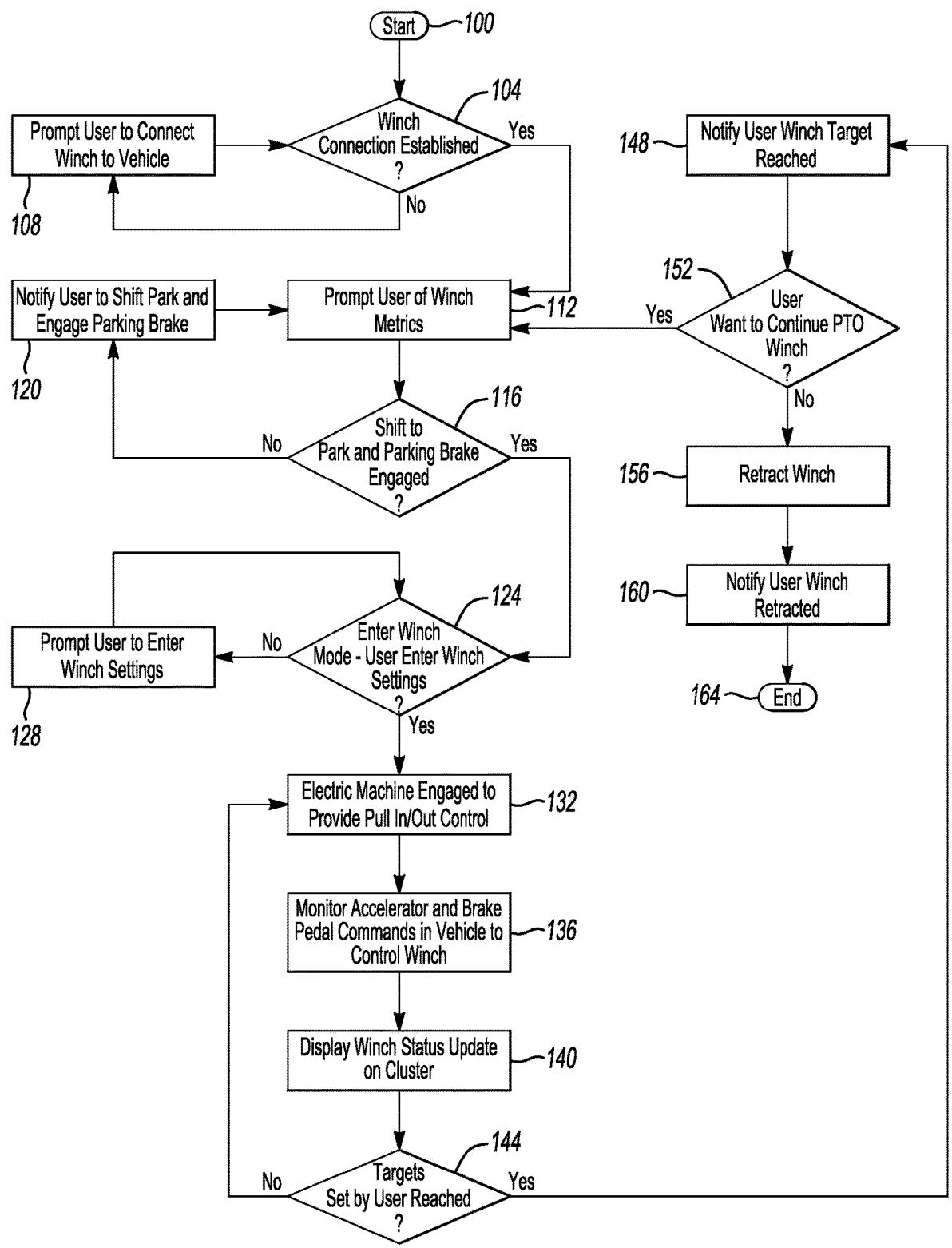
FIG. 5 illustrates a flow of a vehicle winch control method.

With reference now to FIG. 5, a method of controlling the winch 50 of FIGS. 1-3 begins at a step 100 and moves to a step 104, which assesses whether or not a winch, such as the winch 50, is connected to the vehicle 10. If not, the method moves to a step 108 which prompts the user to connect the winch to the vehicle. The prompt could include a speaker on the vehicle 10 broadcasting installation instructions that tell a user how to connect the winch 50 to the vehicle 10.

If at the step 104, the winch 50 is connected to the vehicle 10, the method moves from the step 104 to a step 112 where the method prompts the user for metrics associated with the winch 50. The prompts could request the user to input a desired torque, extension length, etc.

The method then moves to a step 116 which assesses whether or not the vehicle 10 is shifted to a parking gear and a parking brake is engaged. If not, the method moves to a step 120 which notifies the user to transition the vehicle to a parking gear and to engage the parking brake.

If at the step 116, the vehicle 10 is in a parking gear and the parking brake is engaged, the method moves to the step 124 where the vehicle 10 enters a winch mode, and the user enters desired settings for the winch 50 through, for example, reassigned vehicle input devices like steering wheel mounted buttons.

If the user does not enter desired settings for the winch 50, the method moves to the step 128, which prompts the user to desired settings for the winch 50.

If the user has entered which presets at the step 124, the method moves to the step 132 where an electric machine of the vehicle 10 is engaged to provide pull in and pull out operations of the winch 50. The method then moves to the step 136 which monitors accelerator pedal and brake pedal commands that control the pull in and pull out speed.

The method then moves to the step 140 where a status of the winch 50 is updated on a display within the vehicle 10—here a display within an instrument panel of the vehicle 10. Next, at a step 144, the method assesses whether or not the targets set by the user in the step 128 have been achieved. If not, the method moves back to the step 132. If yes, the method moves to the step where the user is notified that the winch targets have been achieved.

The method then moves to the step 152, which assesses whether or not the user wants to continue operation of the winch 50. If yes, the method returns to the step 112. If no, the method moves to the step 156 which retracts the winch 50. The user can then be notified that the winch is then retracted at step 160. The method then ends at a step 164 and the vehicle input devices 80 return to their ordinary control strategies.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle winch control assembly, comprising:
a winch; and
a vehicle input device that is reassigned to control the winch.

2. The vehicle winch control assembly of claim 1, wherein the vehicle input device is an accelerator pedal.

3. The vehicle winch control assembly of claim 2, wherein the winch is configured to speed up in response to the accelerator pedal being pressed down.

4. The vehicle winch control assembly of claim 1, wherein the vehicle input device is a brake pedal.

5. The vehicle winch control assembly of claim 1, wherein the vehicle input device is a steering wheel mounted switch.

6. The vehicle winch control assembly of claim 5, wherein the steering wheel mounted switch is a cruise control switch.

7. The vehicle winch control assembly of claim 1, further comprising an electrified vehicle, the winch connected to the electrified vehicle.

8. The vehicle winch control assembly of claim 7, wherein the winch is connected to a front end of the electrified vehicle.

9. The vehicle winch control assembly of claim 7, further comprising an electric motor that drives wheels of the electrified vehicle, the electric motor configured to selectively drive the winch.

10. The vehicle winch control assembly of claim 9, further comprising a power takeoff, the electric motor driving the winch through the power takeoff.

11. A vehicle winch control method, comprising:
reassigning a vehicle input device; and
after the reassigning, controlling a winch using the vehicle input device.

12. The vehicle winch control method of claim 11, further comprising controlling the winch using an accelerator pedal of a vehicle.

13. The vehicle winch control method of claim 12, further comprising, speeding up the winch by pressing down on an accelerator pedal and slowing down the winch by lifting off the accelerator pedal.

14. The vehicle winch control method of claim 11, further comprising pressing a brake pedal of a vehicle to stop the winch.

15. The vehicle winch control method of claim 11, wherein the vehicle input device is a steering wheel mounted switch, and further comprising controlling the winch using the steering wheel mounted switch.

16. The vehicle winch control method of claim 11, wherein the winch is connected to an electrified vehicle during the controlling.

17. The vehicle winch control method of claim 11, further comprising driving the winch using an electric machine of an electrified vehicle, the electric machine configured to drive wheels of the electrified vehicle.

18. The vehicle winch control method of claim 17, further comprising driving the winch through a power takeoff from the electric machine.

* * * * *